US008107108B1

(12) United States Patent
McKinley et al.

(10) Patent No.: US 8,107,108 B1
(45) Date of Patent: Jan. 31, 2012

(54) PROVIDING USER FEEDBACK IN HANDHELD DEVICE

(75) Inventors: Patrick A. McKinley, Corvallis, OR (US); James D. Bledsoe, Corvallis, OR (US); Asher Simmons, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 980 days.

(21) Appl. No.: 12/038,660

(22) Filed: Feb. 27, 2008

Related U.S. Application Data

(60) Provisional application No. 60/892,113, filed on Feb. 28, 2007.

(51) Int. Cl.
*G06F 3/12* (2006.01)

(52) U.S. Cl. ...... 358/1.15; 358/474; 358/1.18; 382/312; 347/40; 235/462.25

(58) Field of Classification Search .................. 358/474, 358/1.15, 1.18, 473, 472, 488, 497, 296; 382/312, 313, 314, 321; 347/40, 41, 42, 347/43, 109; 235/462.25, 454
See application file for complete search history.

(56) References Cited

U.S. PATENT DOCUMENTS 5,578,813 A 11/1996 Allen et al.
5,927,872 A 7/1999 Yamada
6,030,582 A * 2/2000 Levy .............................. 422/570
6,217,017 B1 * 4/2001 Yamazaki ...................... 271/121
6,332,677 B1 * 12/2001 Steinfield et al. ............... 347/87
6,898,334 B2 * 5/2005 Sayers ........................... 382/313
7,184,167 B1 * 2/2007 Ito et al. ........................ 358/1.18
7,200,560 B2 * 4/2007 Philbert ......................... 704/271
7,336,388 B2 * 2/2008 Breton ........................... 358/1.18
7,410,100 B2 * 8/2008 Muramatsu .............. 235/462.25
7,715,036 B2 * 5/2010 Silverbrook et al. ........ 358/1.15
7,894,095 B2 * 2/2011 Silverbrook et al. ........ 358/1.18
7,929,019 B2 * 4/2011 Ohmura et al. ............ 348/207.2
2003/0150917 A1 * 8/2003 Tsikos et al. .................. 235/454
2004/0021912 A1 * 2/2004 Tecu et al. ...................... 358/473
2009/0034018 A1 * 2/2009 Lapstun et al. ............... 358/473
2009/0279148 A1 * 11/2009 Lapstun et al. ............... 358/488
2010/0039669 A1 * 2/2010 Chang et al. .................. 358/1.15
2010/0231633 A1 * 9/2010 Lapstun et al. ................. 347/16

OTHER PUBLICATIONS

U.S. Appl. No. 12/188,056, filed Aug. 7, 2008, Mealy et al.
U.S. Appl. No. 11/955,209, filed Dec. 12, 2007, Bledsoe et al.
U.S. Appl. No. 11/955,228, filed Dec. 12, 2007, Bledsoe et al.
U.S. Appl. No. 11/955,240, filed Dec. 12, 2007, Bledsoe et al.
U.S. Appl. No. 11/955,258, filed Dec. 12, 2007, Simmons et al.
U.S. Appl. No. 11/959,027, filed Dec. 18, 2007, Simmons et al.
U.S. Appl. No. 11/968,528, filed Jan. 2, 2008, Simmons et al.
U.S. Appl. No. 11/972,462, filed Jan. 10, 2008, Simmons et al.
U.S. Appl. No. 12/013,313, filed Jan. 11, 2008, Bledsoe et al.
U.S. Appl. No. 12/016,833, filed Jan. 18, 2008, Simmons et al.
U.S. Appl. No. 12/036,996, filed Feb. 25, 2008, Bledsoe et al.
U.S. Appl. No. 12/037,029, filed Feb. 25, 2008, Bledsoe et al.
U.S. Appl. No. 12/037,043, filed Feb. 25, 2008, Bledsoe et al.
U.S. Appl. No. 12/041,496, filed Mar. 8, 2008, Mealy et al.
U.S. Appl. No. 12/041,515, filed Mar. 3, 2008, Mealy et al.
U.S. Appl. No. 12/041,535, filed Mar. 3, 2008, Mealy et al.
U.S. Appl. No. 12/062,472, filed Apr. 3, 2008, McKinley et al.

* cited by examiner

*Primary Examiner* — Negussie Worku

(57) ABSTRACT

Apparatuses and methods for providing user feedback for image translation operations in a handheld device are described herein. Progress of the image translation may be displayed to the user of the device. Other embodiments may be described and claimed.

16 Claims, 10 Drawing Sheets

PROVIDING USER FEEDBACK IN HANDHELD DEVICE

CROSS-REFERENCES TO RELATED APPLICATIONS

This present application is a non-provisional application of provisional application 60/892,113, filed on Feb. 28, 2007, and claims priority to said provisional application. The specification of said provisional application is hereby incorporated in its entirety, except for those sections, if any, that are inconsistent with this specification.

TECHNICAL FIELD

Embodiments of the present invention relate to the field of image translation and, in particular, to providing user feedback in handheld image translation devices.

BACKGROUND

Traditional printing devices rely on a mechanically operated carriage to transport a print head in a linear direction as other mechanics advance a print medium in an orthogonal direction. As the print head moves over the print medium an image is formed as ink is deposited on the print medium. This mechanized motion of the print head and print medium may allow for image data to be queued up in a predetermined and predictable manner. The print head will advance over the print medium at a rate that will allow all of the necessary ink to be deposited at each location. Once the print head has passed over a sufficient amount of the surface of the print medium to print the image in memory, the print job is complete.

While this structured movement of print head and media may work well with traditional printers, the random motion of a handheld printing device prevents a similar reliance on the steady, consistent, and predictable advancement of the print head over the surface of the print medium. The user-supplied motion of the handheld printing device may not provide adequate coverage of the print medium. Furthermore, reliance upon visual inspection of the printed image may be insufficient to determine what has been, or has yet to be, printed. This may occur, for example, when a portion of the printed image has some, but not all, of the ink deposited. This type of inadequate coverage may be difficult to detect visually during the printing process, but may have a significant impact to the perceived image quality of the printed image when viewed after the printing process has been completed.

SUMMARY

There is provided, in accordance with various embodiments of the present invention, a printing device having a communication interface configured to receive image data from an image source; a position module configured to capture a plurality of navigational measurements; a print module configured to print an image, based at least in part on the image data and navigational measurements, on a medium adjacent to the device as the device is moved over the medium; and a display module configured to display information about progress of the printing of the image.

The device may further include one or more navigation sensors configured to be controlled by the position module to capture the plurality of navigational measurements; a print head configured to be controlled by the print module to print the image; and a display configured to be controlled by the display module to display the information.

The information displayed may include location information about one or more areas of the image that are not fully printed. In some embodiments, the location information may include one or more directional indicators providing directions, relative to the device, of the one or more areas.

In some embodiments, the display module is configured to display a print progress image. An area of the print progress image may have a displayed intensity inversely proportional to a printing progress of a corresponding area of the image.

In some embodiments, the display module is further configured to zoom in on a selected portion of the print progress image.

In some embodiments, the display module is further configured to display a marker representing the device on the print progress image.

A method of printing is also disclosed in various embodiments. The method may include receiving image data from an image source; capturing a plurality of navigational measurements; printing an image, based at least in part on the image data and the navigational measurements, on a medium; and displaying information about progress of the printing of the image.

In some embodiments, the displaying information comprises displaying location information about one or more areas of the image that are not fully printed.

In some embodiments, the displaying information comprises displaying a print progress image. The displayed version may comprise displaying an area of the print progress image with an intensity inversely proportional to a printing progress of a corresponding area of the image.

A scanning device is also disclosed in accordance with various embodiments. The scanning device may include a position module configured to capture a plurality of navigational measurements; an image capture module configured to scan a target image on a surface adjacent to the device as the device is moved over the surface; and a display module configured to display information about progress of the scanning of the target image throughout the scanning of the target image.

In some embodiments, the scanning device includes one or more navigation sensors configured to be controlled by the position module to capture the plurality of navigational measurements; one or more optical imaging sensors configured to be controlled by the image capture module to scan the target image; and a display configured to be controlled by the display module to display the information.

In some embodiments, the information includes location information about one or more areas of the target image that are not fully scanned. The location information may include one or more directional indicators providing directions, relative to the device, of the one or more areas.

In some embodiments, the display module is further configured to display a scan progress image.

In some embodiments, the display module is further configured to display a marker representing the scanning device.

In some embodiments, the image capture module is configured to capture a plurality of component surface images and the scanning device further comprises an image processing module configured to generate the scan progress image based at least in part on the plurality of navigational measurements and the plurality of component surface images.

A method of scanning is also disclosed in accordance with various embodiments. In some embodiments, the method includes capturing a plurality of navigational measurements; scanning a target image on a surface; and displaying information about progress of the scanning of the target image throughout said scanning of the target image.

In some embodiments, the displaying information comprises displaying location information about one or more areas of the target image that are not fully scanned.

In some embodiments, the displaying information comprises displaying a scan progress image.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Figure 1:
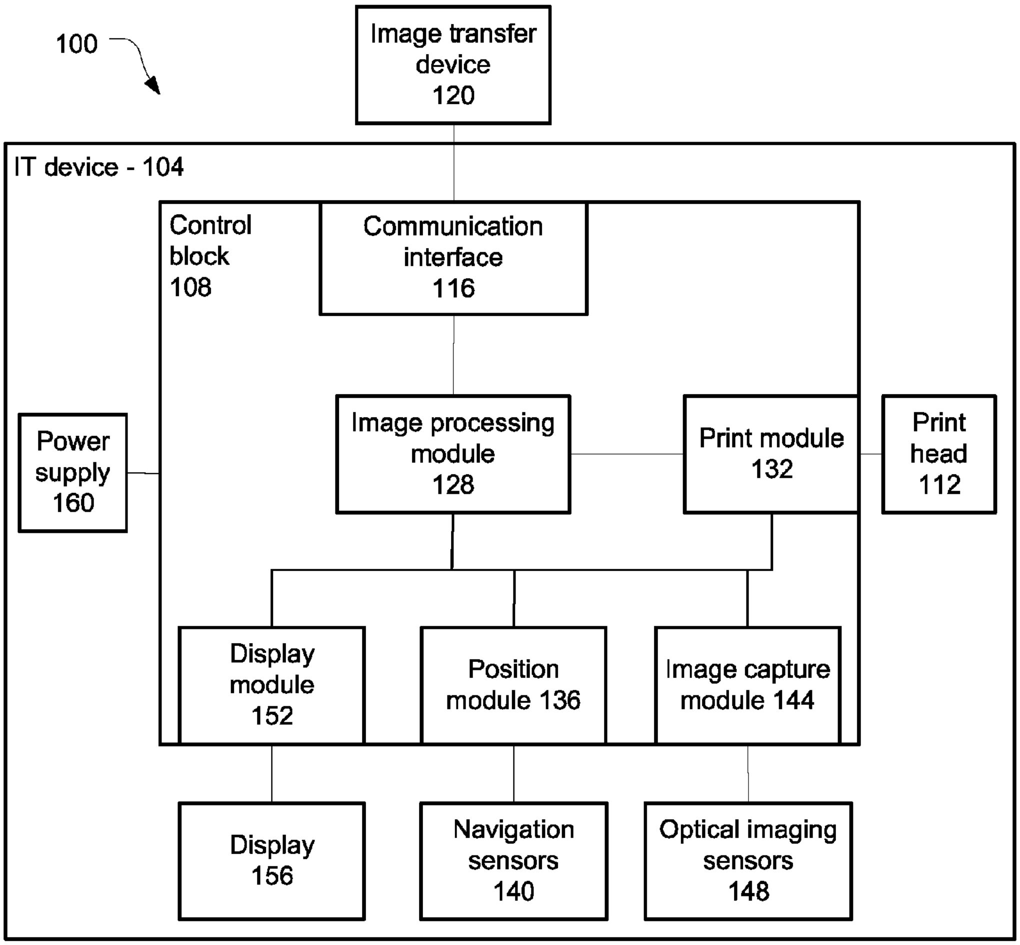
FIG. 1 is a schematic of a system including a handheld image translation device in accordance with various embodiments of the present invention.

FIG. 1 is a schematic of a system 100 including a handheld image translation (IT) device 104 (hereinafter "device 104") in accordance with various embodiments of the present invention. The device 104 may include a control block 108 with components designed to facilitate precise and accurate positioning the device throughout an entire IT operation. This positioning may allow for reliable and rapid image translation in a truly mobile platform as will be explained herein.

Image translation, as used herein, may refer to a translation of an image that exists in a particular context (e.g., medium) into an image in another context. For example, an image translation operation may be a scan operation. In this situation, a target image, e.g., an image that exists on a tangible medium, is scanned by the device 104 and an acquired image that corresponds to the target image is created and stored in memory of the device 104. For another example, an image translation operation may be a print operation. In this situation, an acquired image, e.g., an image as it exists in memory of the image translation device 104, may be printed onto a medium.

The control block 108 may include a communication interface 116 configured to communicatively couple the control block 108 to an image transfer device 120. The image transfer device 120 may be any type of device capable of transmitting image data related to an image involved in an IT operation. The image transfer device 120 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image transfer device 120 is a removable storage device, e.g., a universal serial bus (USB) storage device, the communication interface may include a port, e.g., USB port, designed to receive the storage device.

The communication interface 116 may include a wireless transceiver to allow the communicative coupling with the image transfer device 120 to take place over a wireless link. The image data may be wirelessly transmitted over the link through the modulation of electromagnetic waves with frequencies in the radio, infrared or microwave spectrums.

A wireless link may contribute to the mobility and versatility of the device 104. However, some embodiments may additionally/alternatively include a wired link communicatively coupling the image transfer device 120 to the communication interface 116.

In some embodiments, the communication interface 116 may communicate with the image transfer device 120 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

In an embodiment where the IT operation includes a print operation, the communication interface 116 may receive image data from the image transfer device 120 and transmit the received image data to an on-board image processing module 128. The image processing module 128 may process the received image data in a manner to facilitate an upcoming printing process.

Image processing techniques may include dithering, decompression, half-toning, color plane separation, and/or image storage. In various embodiments some or all of these image processing operations may be performed by the image transfer device 120 or another device. The processed image may then be transmitted to a print module 132 where it is cached in anticipation of a print operation.

The print module 132 may also receive positioning information, indicative of a position of the print head 112 relative to a reference location, from a position module 136. The position module 136 may be communicatively coupled to one or more navigation sensors 140 configured to capture navigational measurements to facilitate a positioning operation. In some embodiments, the navigation sensors 140 may include imagining navigation sensors and the captured navigational measurements may include navigational images of a medium adjacent to the device 104.

An imaging navigation sensor may include a light source, e.g., LED, a laser, etc., and an optoelectronic sensor designed to capture a series of navigational images as the device 104 is moved over an adjacent medium. The position module 136 may process the navigational images provided by the navigation sensors 140 to detect structural variations of the print medium. The movement of the structural variations in successive images may indicate motion of the device 104 relative to the medium. Tracking this relative movement may facilitate determination of the precise positioning of the navigation sensors 140. The navigation sensors 140 may be maintained in a structurally rigid relationship with the print head 112, thereby allowing for the calculation of the precise location of the print head 112.

Once the print module 132 receives the positioning information it may coordinate the location of the print head 112 to a portion of the processed image with a corresponding location. The print module 132 may then control the print head 112 in a manner to deposit a printing substance on the print medium to represent the corresponding portion of the processed image.

The print head 112 may be an inkjet print head having a plurality of nozzles designed to emit liquid ink droplets. The ink, which may be contained in reservoirs/cartridges, may be black and/or any of a number of various colors. A common, full-color inkjet print head may have nozzles for cyan, magenta, yellow, and black ink. Other embodiments may utilize other printing techniques, e.g., toner-based printers such as laser or light-emitting diode (LED) printers, solid ink printers, dye-sublimation printers, inkless printers, etc.

The control block 108 may also include an image capture module 144. The image capture module 144 may be communicatively coupled to one or more optical imaging sensors 148. The optical imaging sensors 146 may include a number of individual sensor elements designed to capture surface images of an adjacent surface, which may be individually referred to as component surface images. The image processing module 128 may receive the component surface images from the image capture module 144 and stitch them together to generate a composite image. The image processing module 128 may receive positioning information from the position module 136 to facilitate the arrangement of the component surface images into the composite image. In some embodiments, the image capture module 144 may be additionally/alternatively responsible for generating the composite image from the captured component images.

In an embodiment in which the device 104 is capable of scanning full color images, the optical imaging sensors 148 may have the sensor elements designed to scan different colors.

A composite image acquired by the device 104 may be subsequently transmitted to one or more of the other devices 120 by, e.g., e-mail, fax, file transfer protocols, etc. The composite image may be additionally/alternatively stored locally by the printing device 104 for subsequent review, transmittal, printing, etc.

In addition (or as an alternative) to composite image acquisition, the image capture module 144 may be utilized for calibrating the position module 136. In various embodiments, the component surface images (whether individually, some group, or collectively as the composite image) may be compared to the processed print image rendered by the image processing module 128 to correct for accumulated positioning errors and/or to reorient the position module 136 in the event the position module 136 loses track of its reference location. This may occur, for example, if the device 104 is removed from the medium during an IT operation.

The control block 108 may further include a display module 152, which may include a display controller. The display module 152 may control a display 156 in a manner to provide a user with information about progress of an IT operation. The user may use this displayed information to adjust positioning of the device 104 so that the IT operation is completed in a shorter time period than it would be without such feedback.

When the device 104 includes printing functionalities, the display 156 may display a version of the image that is being printed. This version may be referred to as the print progress image. The display module 152 may receive the print progress image from the image processing module 128. As a print operation progresses, the image processing module 128 may receive updated printing progress reports from the print module 132 and update the displayed print progress image accordingly. In an alternative embodiment, the print module 132 may provide updates directly to the display module 152.

When the device 104 includes scanning functionalities, the display 156 may display a version of the composite image in its various stages of acquisition. This version may be referred to as the scan progress image. The display module 152 may receive the scan progress image from the image processing module 128. As the scan operation progresses, the composite image, and associated scan progress image, may grow due to the addition of component surface images. The image processing module 128 may periodically update the displayed scan progress image transmitted to the display module 152. In an alternative embodiment, the image capture module 144 may provide the composite image directly to the display module 152.

While the above discusses the display 156 displaying a version of the image to be printed or the image that has been scanned, other embodiments may additionally/alternatively provide progress information in other ways. For example, in an embodiment the display 156 may simply provide directional indicators that indicate a direction, relative to the device 104, of areas that need additional scanning/printing. The user may then simply move the device 104 according to the directional indicators.

In another embodiment, the display 156 may indicate the progress by conveying information related to the proportion printed/scanned to the proportion remaining to be printed/scanned. This may be a numerical percentage, e.g., 50% printed, a status bar, etc.

While the display 156 is shown as a part of the device 104 in FIG. 1, other embodiments may have the display 156 situated elsewhere, e.g., on the image transfer device 120.

The printing device 104 may include a power supply 160 coupled to the control block 108. The power supply 160 may be a mobile power supply, e.g., a battery, a rechargeable battery, a solar power source, etc. In other embodiments the power supply 160 may additionally/alternatively regulate power provided by another component (e.g., one of the other devices 120, a power cord coupled to an alternating current (AC) outlet, etc.).

In various embodiments, device 104 may have more or less elements and/or different architectures.

Figure 2:
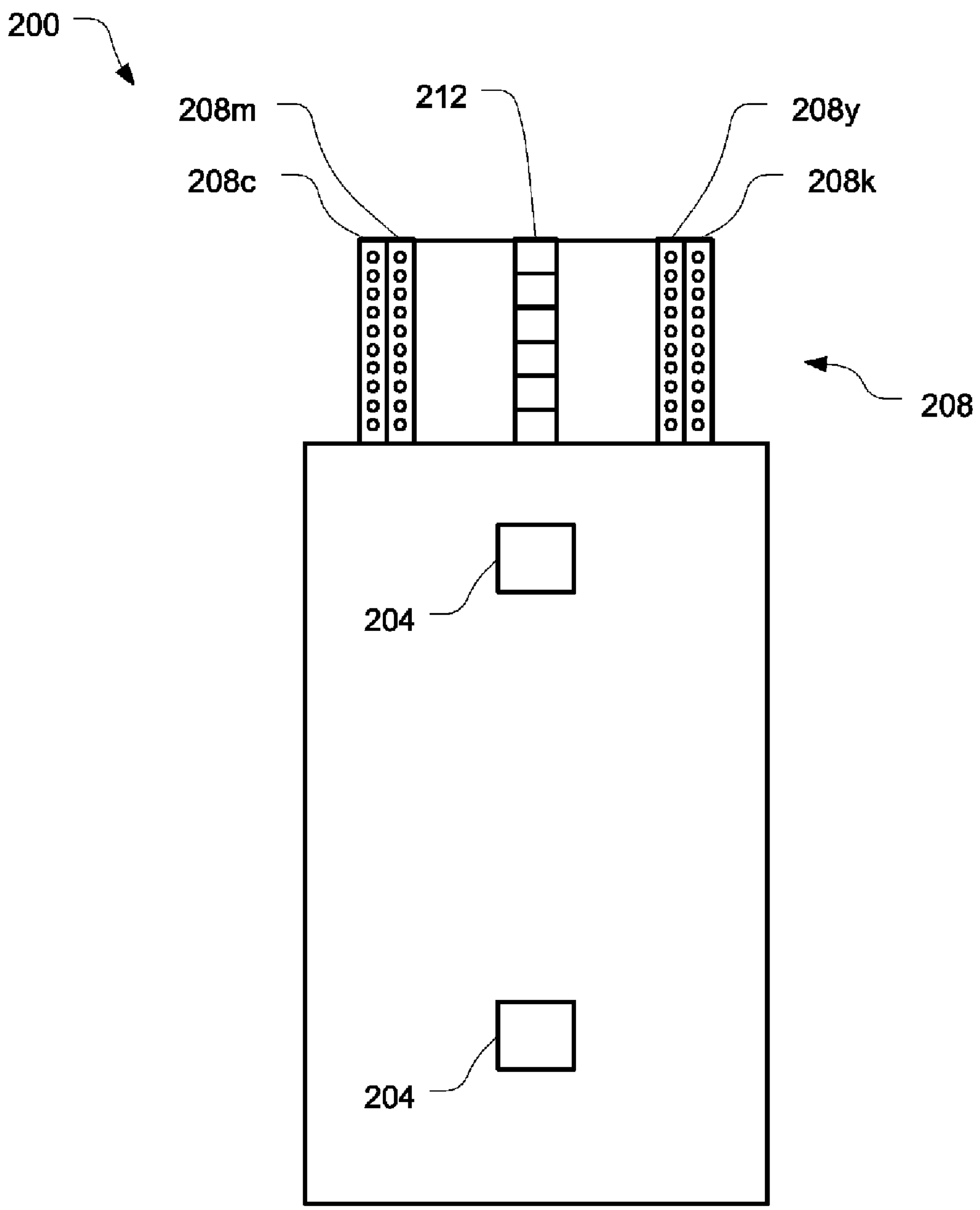
FIG. 2 is a bottom plan view of a handheld image translation device in accordance with various embodiments of the present invention.

FIG. 2 is a bottom plan view of a handheld IT device 200 (hereinafter "device 200") in accordance with various embodiments of the present invention. The device 200, which may be substantially interchangeable with the device 104, may have a pair of navigation sensors 204, a print head 208, and optical imaging sensors 212.

The pair of navigation sensors 204 may be used by a position module to determine positioning information related to the print head 208 and/or optical imaging sensors 212. As stated above, the proximal relationship of the print head 208 and/or optical imaging sensors 212 to the navigation sensors 204 may be fixed to facilitate a positioning determination through information obtained by the navigation sensors 204.

The print head 208 may be an inkjet print head having a number of nozzle rows for different colored inks. In particular, and as shown in FIG. 2, the print head 208 may have a nozzle row 208*c* for cyan-colored ink, a nozzle row 208*m* for magenta-colored ink, a nozzle row 208*y* for yellow-colored ink, and nozzle row 208*k* for black-colored ink.

While the nozzle rows 208*c*, 208*m*, 208*y*, and 208*k* shown in FIG. 2 are arranged in rows according to their color, other embodiments may intermix the different colored nozzles in a manner that may increase the chances that an adequate amount of appropriate colored ink is deposited on the print medium through the natural course of movement of the device 200 over the print medium.

In the embodiment depicted by FIG. 2, the linear dimension of the optical imaging sensors 212 may be similar to the linear dimension of the nozzle rows of the print head 208. The linear dimensions may refer to the dimensions along the major axis of the particular component, e.g., the vertical axis of the optical imaging sensors 212 as shown in FIG. 2. Having similar linear dimensions may provide that roughly the same amount of passes over a medium are required for a complete scan and print operation. Furthermore, having similar dimensions may also facilitate the positioning calibration as a component surface image captured by the optical imaging sensors 212 may correspond to deposits from an entire nozzle row of the print head 208.

Figure 3:
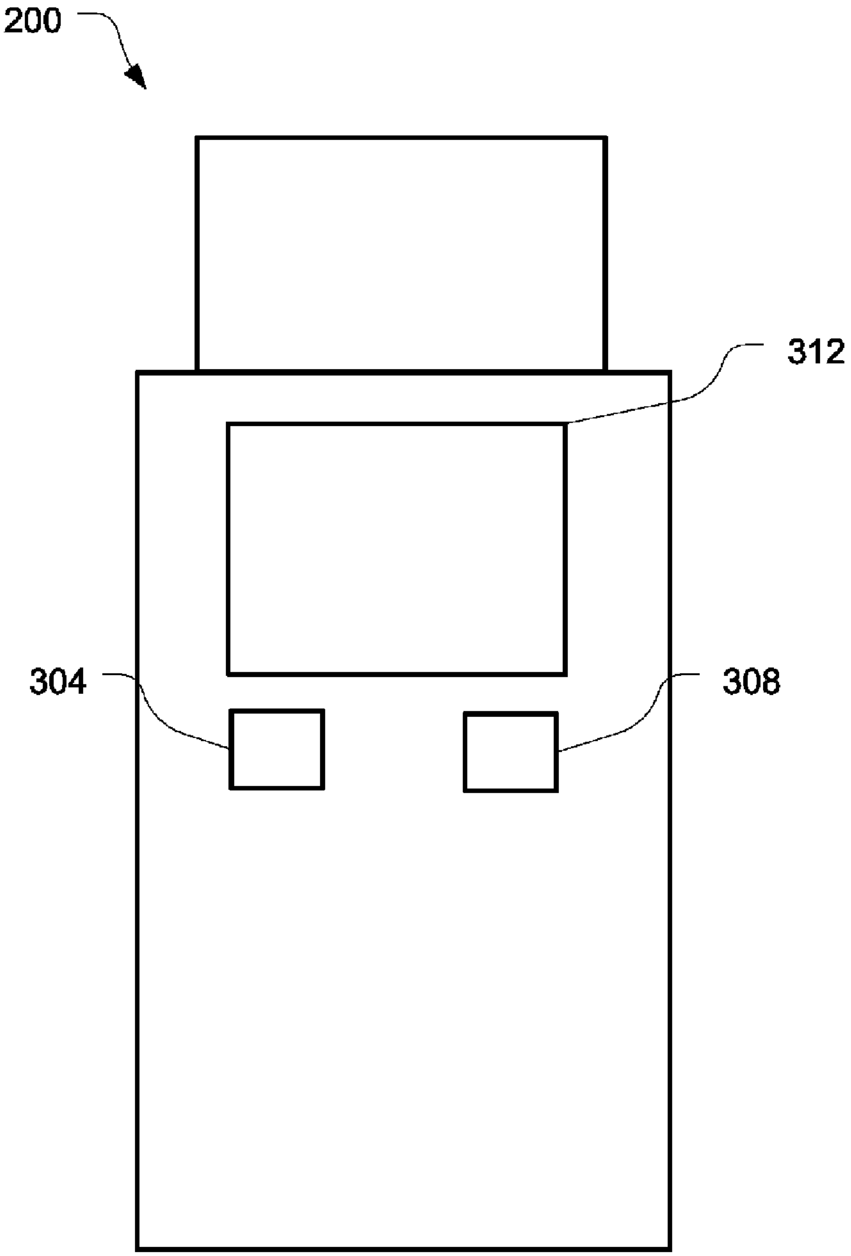
FIG. 3 is a top plan view of a handheld image translation device in accordance with various embodiments of the present invention.

FIG. 3 is a top plan view of the device 200 in accordance with various embodiments of the present invention. The device 200 may have a variety of user input/outputs to provide the functionality enabled through use of the device 200. Some examples of input/outputs that may be used to provide some of the basic functions of the device 200 include, but are not limited to, a print control input 304 to initiate/resume a print operation, a scan control input 308 to initiate/resume a scan operation, and a display 312.

The display 312, which may be a passive display, an interactive display, etc., may provide the user with a variety of information. In some embodiments, in addition to providing information about the progress of a print and/or scan operation, the display 312 may provide other information such as, but not limited to, information related to the current operating status of the device 200 (e.g., printing, ready to print, scanning, ready to scan, receiving print image, transmitting print image, etc.), power of the battery, errors (e.g., positioning/printing error, etc.), instructions (e.g., "position device over a printed portion of the image for reorientation," etc.). If the display 312 is an interactive display it may provide a control interface in addition to, or as an alternative from, the control inputs 304 and 308.

The display 312 may be, but is not limited to, a liquid crystal display (LCD), an organic light-emitting diode (OLED) display, etc.

Figure 4:
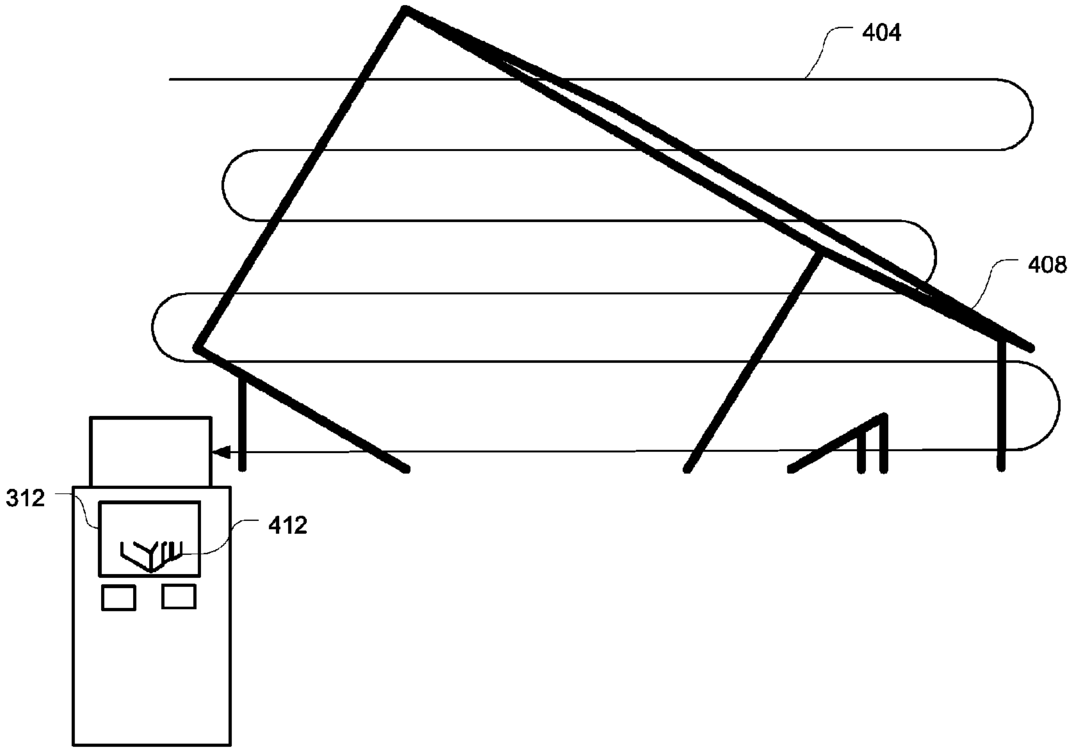
FIG. 4 illustrates a printing operation of a handheld image translation device in accordance with various embodiments of the present invention.

FIG. 4 illustrates a printing operation of the device 200 in accordance with various embodiments of the present invention. The image to be printed through this operation is that of a house. Line 404 illustrates a general path over which the device 200 has traversed, resulting in a printed image 408 of the top of the house. Display 312 may display a print progress image 412. The print progress image 412 may provide an indication as to which portions of a processed image have been fully printed and which portions of the processed image have yet to be fully printed. In this instance, the printed image 408 has been fully printed (e.g., a sufficient amount of ink has been deposited on the top of the house) and the print progress image 412 shows only the bottom of the house, as this is the portion that has yet to be printed. A user controlling the device 200 may then know where to position the device 200 to complete the printing operation.

This visual feedback information provided to the user by the display 312 may allow the user to easily understand the printing progress. An understanding that may not be discernible by viewing the printed image 408 as the device 200 may obscure large portions of the print medium and casual visual inspection may not reliably determine whether a sufficient amount of ink has been deposited at a given location.

Figure 5:
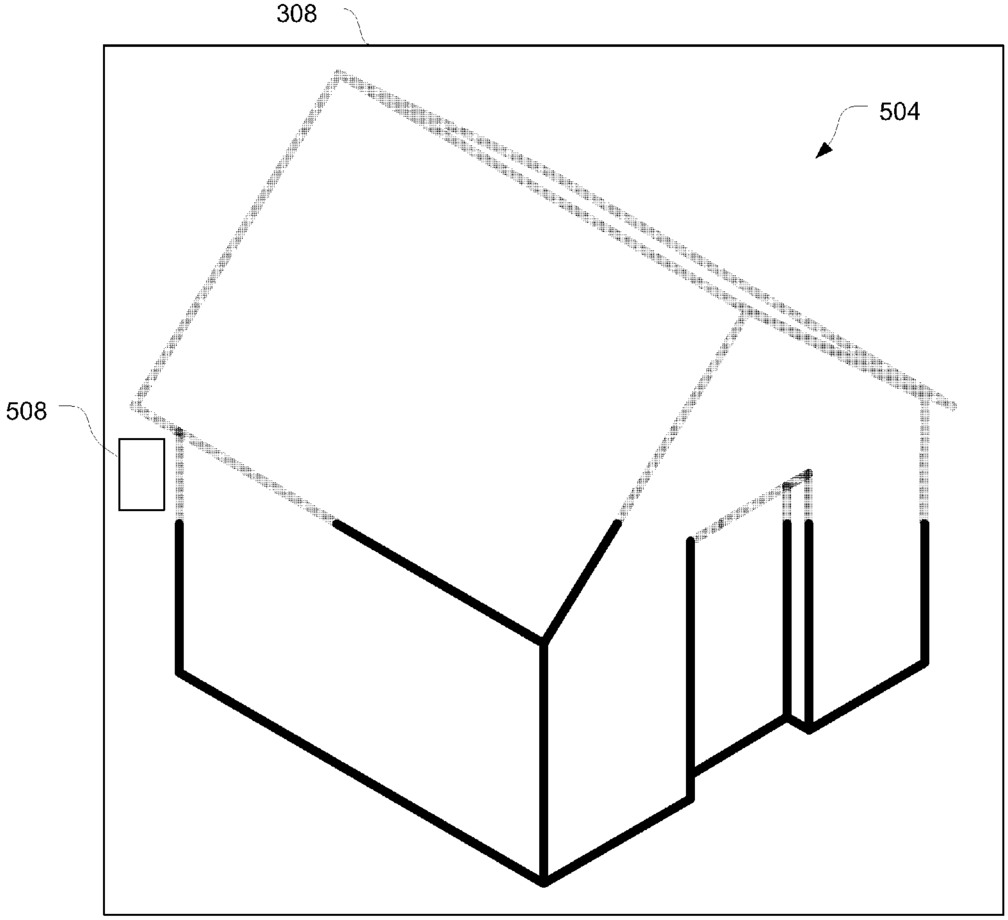
FIG. 5 is a display of a handheld image translation device in accordance with various embodiments of the present invention.

FIG. 5 illustrates the display 312 in accordance with another embodiment of this invention. In this embodiment, a print progress image 504 illustrates a partially printed image of a house similar to the embodiment shown in FIG. 4. However, in this embodiment, the device 200 has only partially printed the top part of the house. This may occur, for example, if the device 200 was moved too quickly.

The fact that the top part is only partially printed is shown by the print progress image 504 displaying the top portion with a reduced intensity. Thus, an area of the print progress image 504 may be displayed with an intensity inversely proportional to a printing progress, e.g., a stage of completion, of a corresponding area of the processed image. For example, a processed image may call for four drops of ink to be deposited in a given area. If one out of the four drops of ink is deposited, the corresponding area of a print progress image may be lightened by twenty-five percent; if two out of the four drops are deposited, the corresponding area of the print progress image may be lightened fifty percent, and so on. In various embodiments, the proportionality of the intensity of the print progress image to the print progress may not be linear. Furthermore, the range of the intensity of the print progress image may be zero percent to one hundred percent or something less.

This feedback may inform the user of the need to revisit the areas that have only been partially printed.

As mentioned above, determining whether a portion of a processed image has been fully printed may not necessarily be discoverable through casual visual inspection of the printed image. This may be especially true when the processed image is a colored image. It may be that some of the colors have been printed, but others have not, resulting in off-shades that may not be immediately perceptible.

The display 312 as shown in FIG. 5 may also show a marker 508 representing a position of the print head 208 (and/or optical imaging sensors 212) on the print progress image 504.

The marker 508, which may be an image of the print head 208 as generally shown, a cursor, etc., may further assist a user in placement of the device 200.

Figure 6:
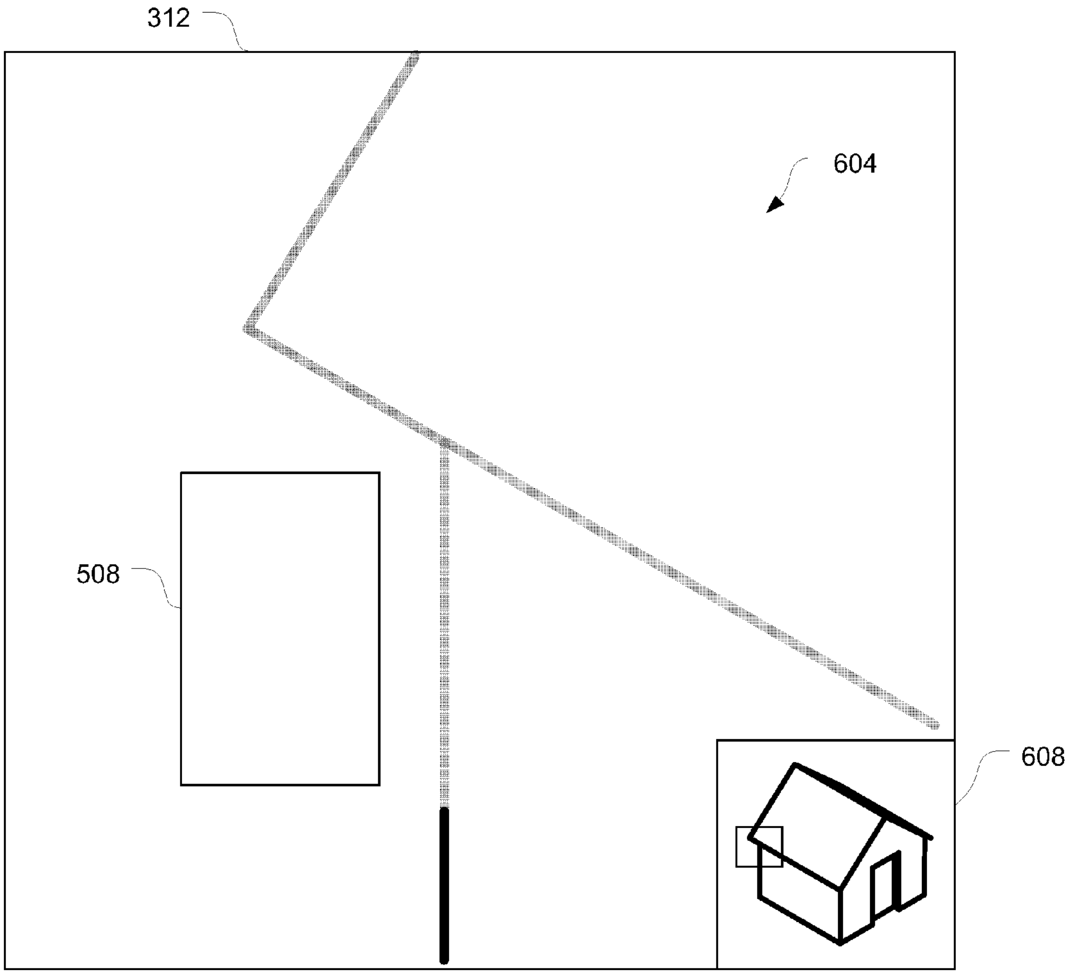
FIG. 6 is another view of a display of a handheld image translation device in accordance with various embodiments of the present invention.

FIG. 6 illustrates the display 312 in accordance with another embodiment of the present invention. In this embodiment, the display 312 may be controlled to provide a local-area view 604 by zooming in on a selected area of the print progress image 504. This may allow the user to analyze the printed and nonprinted areas of the local area in sufficient detail.

In some embodiments, the display 312 may also include a full-area view 608 that may show which area of the print progress image 504 is being shown in the local-area view.

Figure 7:
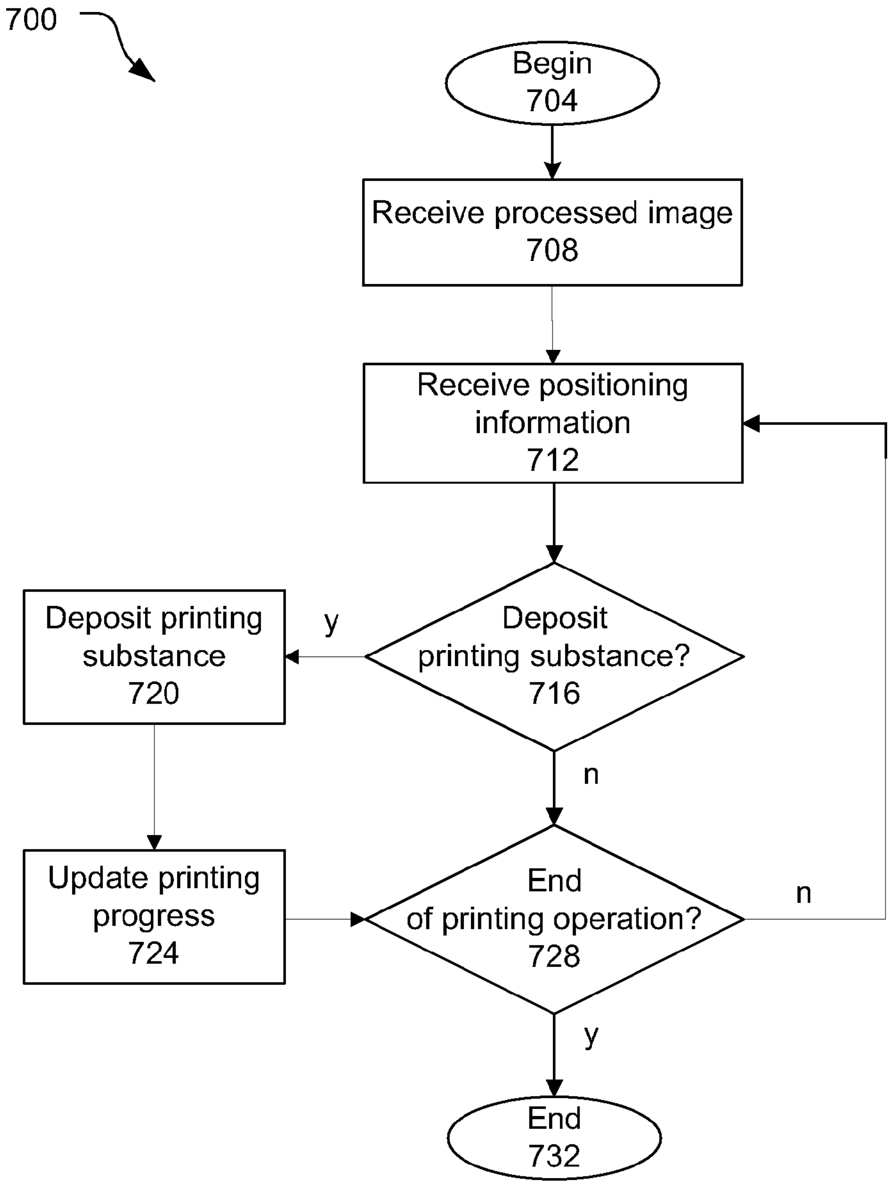
FIG. 7 is a flow diagram depicting a print operation in accordance with various embodiments of the present invention.

FIG. 7 is a flow diagram 700 depicting a print operation of the device 200 in accordance with various embodiments of the present invention. The printing operation may begin at block 704 and a print module may receive a processed image for printing from an image processing module at block 708. Upon receipt of the processed image, the display may indicate that the device 200 is ready for printing, which may commence with the activation of the print control input 304.

The print module may receive positioning information from a position module at block 712 and correlate the positioning information to a corresponding area of the processed image to make a print determination at block 716. If it is determined that additional ink is to be deposited at the position in which the device is located, the print module may control a print head to do so at block 720.

After ink is deposited, the print module may update the printing progress by feeding back information about the deposition of additional ink at the given location to the image processing module at block 724. The updating of the printing progress may occur by the print module updating and/or maintaining the processed image and/or an associated data structure in memory in a manner that allows the image processing module to determine what has and what has yet to be printed. For example, in one embodiment the print module may decrement a print value associated with a particular location as dots are placed. When the print value is zero, no further printing is necessary at that location. In other embodiments other ways of updating the printing progress may be employed.

After updating the printing progress (or if it is determined that no additional printing substance is to be deposited in block 716), the operation may advance to block 728 to determine whether the end of the print operation has been reached.

The determination of whether the end of the printing operation has been reached in block 728 may be a function of the printed volume versus the total print volume. In some embodiments the end of the printing operation may be reached even if the printed volume is less than the total print volume. For example, an embodiment may consider the end of the printing operation to occur when the printed volume is ninety-five percent of the total print volume. However, it may be that the distribution of the remaining volume is also considered in the end-of-print analysis. For example, if the five percent remaining volume is distributed over a relatively small area, the printing operation may not be considered to be completed.

In some embodiments, a printing operation may be ended by a user manually cancelling the operation.

If, at block 728, it is determined that the printing operation has been completed, the printing operation may conclude in block 732.

If, at block 728, it is determined that the printing operation has not been completed, the printing operation may loop back to block 712.

Figure 8:
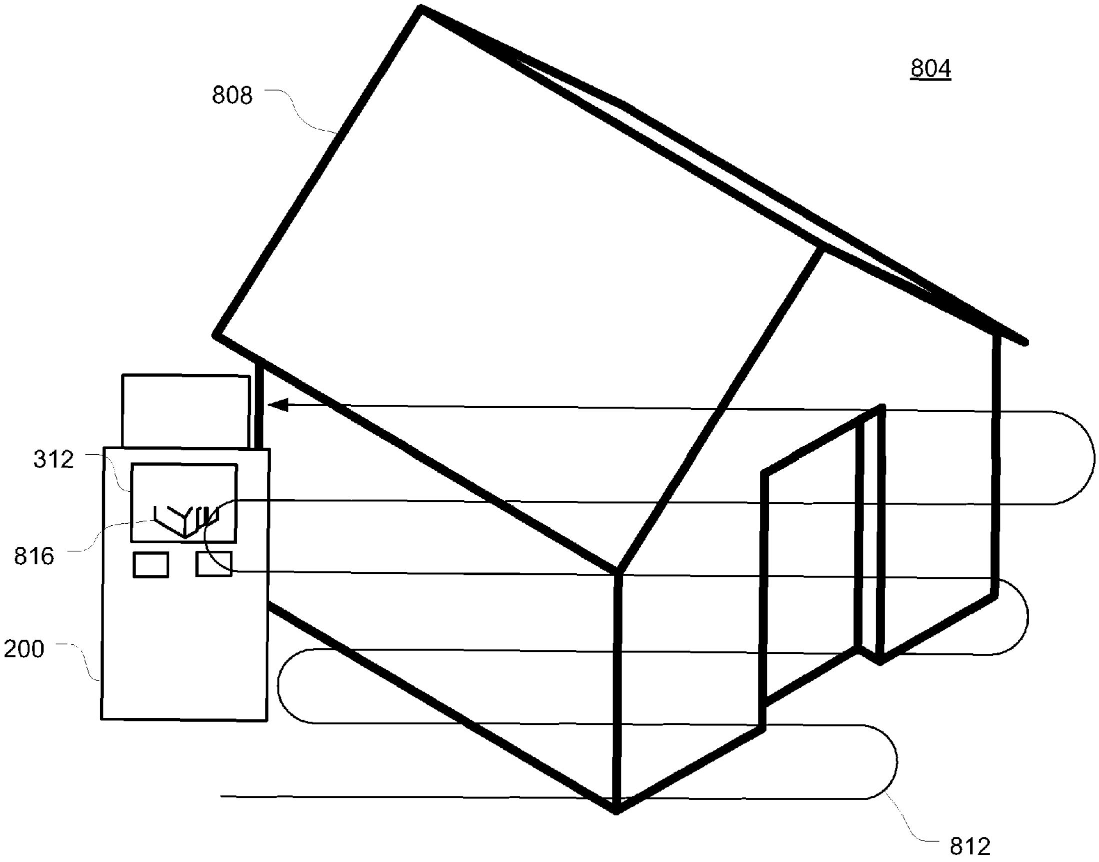
FIG. 8 illustrates a scanning operation of a handheld image translation device in accordance with various embodiments of the present invention.

FIG. 8 illustrates a scanning operation of the device 200 in accordance with various embodiments of the present invention. In this embodiment, a surface 804 may have a target image 808, e.g., of a house, printed thereon. Line 812 illustrates a general path over which the device 200 has traversed, resulting in a scan progress image 816 being displayed on the display 312. Specifically, the scan progress image 816 shows the bottom portion of the target image 808. This feedback may instruct the user as to which portions of the target image 808 have yet to be scanned, e.g., the top portion.

The scan progress image 816 may represent the composite image in its various stages of acquisition. The scan progress image 816 may be updated as additional component surface images are acquired by an image capture module and optical imaging sensors. The scan progress image 816 may be displayed throughout the scanning operation.

Figure 9:
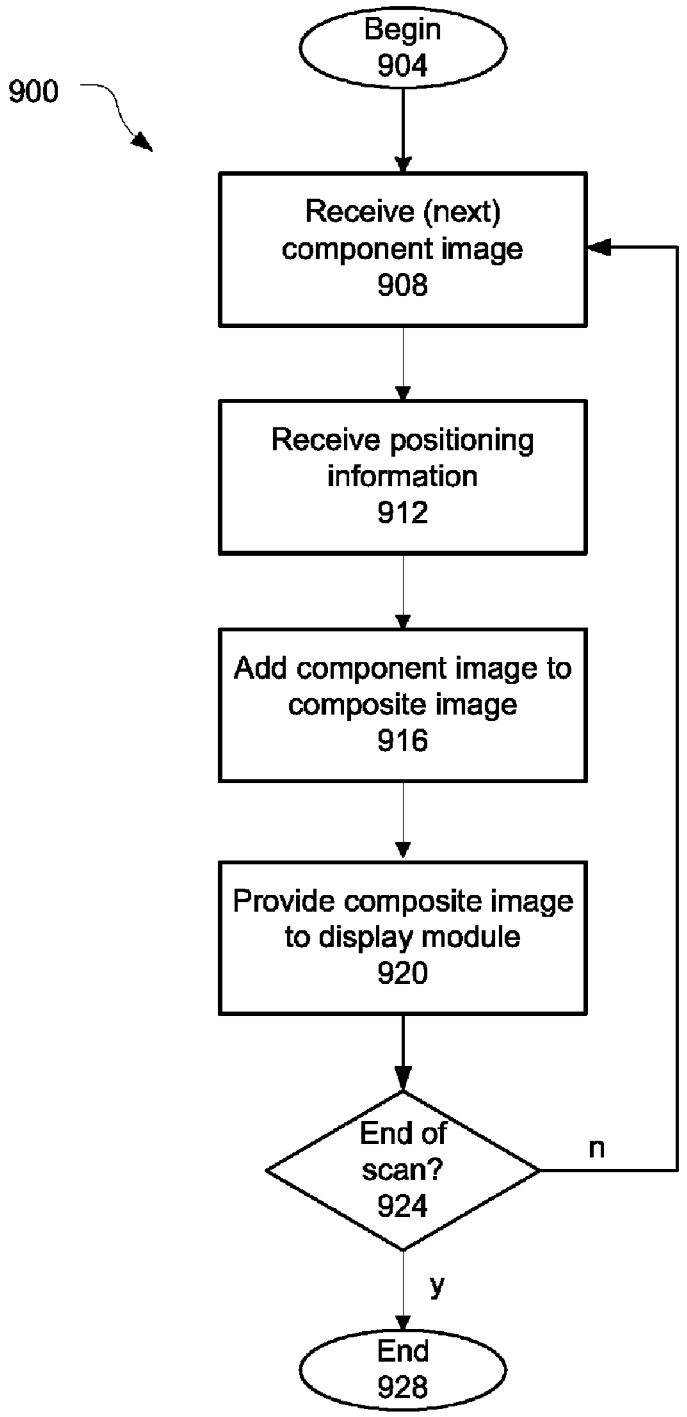
FIG. 9 is a flow diagram depicting a composite image generation throughout a scan operation in accordance with various embodiments of the present invention.

FIG. 9 is a flow diagram 900 depicting a composite image generation throughout a scan operation of the device 200 in accordance with various embodiments of the present invention. A scan operation may begin at block 904 with the receipt of a scan command generated from a user activating the scan control input 308. In some embodiments, the scan operation will only commence when the device 200 is placed on a surface. This may be ensured by, e.g., instructing the user to initiate the scanning operation only when the device 200 is in place and/or automatically determining that the device 200 is in place.

The image processing module may receive one or more component images captured by the optical imaging sensors 212 from the image capture module at block 908. The image processing module may also receive positioning information from the positioning module at block 912. The image processing module may utilize the positioning information to add the component images to the composite image at block 916. The in-progress composite image, which may correspond to the scan progress image, may be provided to a display module for display at block 920.

The device 200 may then determine if the scanning operation is complete at block 924. The end of the scanning operation may be determined through a user manually cancelling the operation and/or through an automatic determination. In some embodiments, an automatic determination of the end of scan job may occur when all interior locations of a predefined image border have been scanned. The predefined image border may be determined by a user providing the dimensions of the image to be scanned or by tracing the border with the device 200 early in the scanning sequence.

If, at block 924, it is determined that the scanning operation has been completed, the scanning operation and associated composite image generation may conclude in block 928.

If, at block 924, it is determined that the scanning operation has not been completed, the operation may loop back to block 908.

Figure 10:
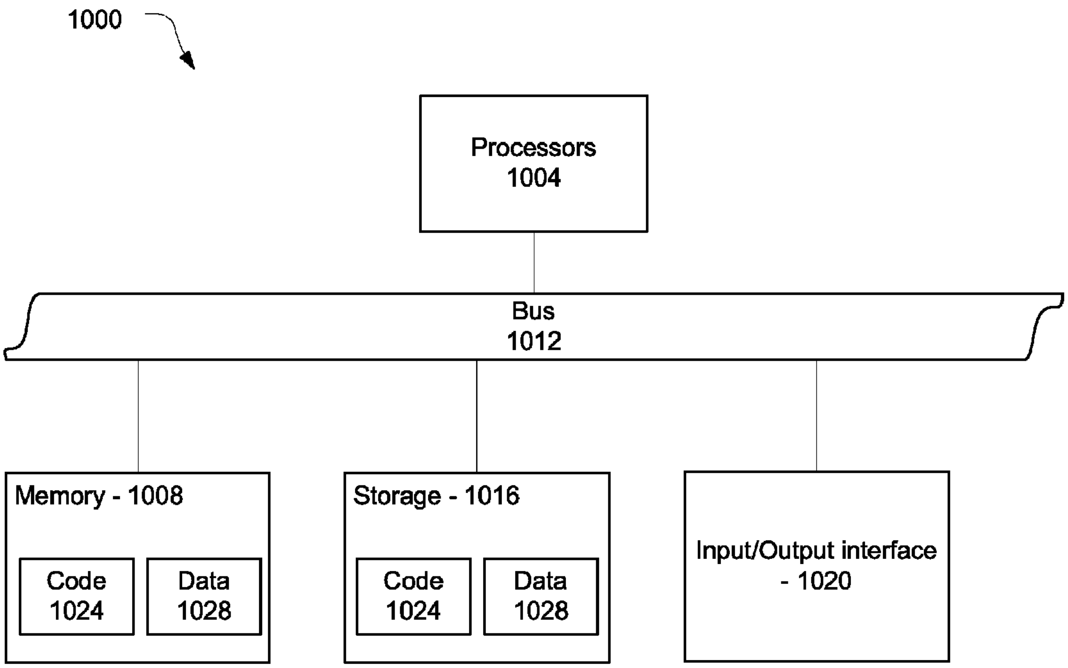
FIG. 10 illustrates a computing device capable of implementing a control block of a handheld image translation device in accordance with various embodiments of the present invention.

FIG. 10 illustrates a computing device 1000 capable of implementing a control block, e.g., control block 108, in accordance with various embodiments. As illustrated, for the embodiments, computing device 1000 includes one or more processors 1004, memory 1008, and bus 1012, coupled to each other as shown. Additionally, computing device 1000 includes storage 1016, and one or more input/output interfaces 1020 coupled to each other, and the earlier described elements as shown. The components of the computing device 1000 may be designed to provide the image translation, position, and/or display functions of a control block of a device as described herein.

Memory 1008 and storage 1016 may include, in particular, temporal and persistent copies of code 1024 and data 1028, respectively. The code 1024 may include instructions that when accessed by the processors 1004 result in the computing device 1000 performing operations as described in conjunction with various modules of the control block in accordance with embodiments of this invention. The processing data 1028 may include data to be acted upon by the instructions of the code 1024, e.g., print data of a processed image. In particular, the accessing of the code 1024 and data 1028 by the processors 1004 may facilitate image translation, positioning and/or displaying operations as described herein.

The processors 1004 may include one or more single-core processors, multiple-core processors, controllers, application-specific integrated circuits (ASICs), etc.

The memory 1008 may include various levels of cache memory and/or main memory and may be random access memory (RAM), dynamic RAM (DRAM), static RAM (SRAM), synchronous DRAM (SDRAM), dual-data rate RAM (DDRRAM), etc.

The storage 1016 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 1016 may be a storage resource physically part of the computing device 1000 or it may be accessible by, but not necessarily a part of, the computing device 1000. For example, the storage 1016 may be accessed by the computing device 1000 over a network.

The I/O interfaces 1020 may include interfaces designed to communicate with peripheral hardware, e.g., print head 112, navigation sensors 140, optical imaging sensors 148, display 156, etc., and/or remote devices, e.g., image transfer device 120.

In various embodiments, computing device 1000 may have more or less elements and/or different architectures.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. A handheld image translation (IT) device comprising:
- a communication interface configured to receive image data from an image source;
- a position module configured to capture a plurality of navigational measurements;
- a print module configured to print an image, based at least in part on (i) the image data and (ii) the plurality of navigational measurements, on a medium adjacent to the handheld IT device as the handheld IT device is moved over the medium; and
- a display module configured to display information about progress of the printing of the image;
- wherein the information includes location information about one or more areas of the image that are not fully printed, and
- wherein the location information includes one or more directional indicators providing directions, relative to the handheld IT device, of the one or more areas of the image that are not fully printed.

2. The handheld IT device of claim 1, further comprising:
- one or more navigation sensors configured to be controlled by the position module to capture the plurality of navigational measurements;
- a print head configured to be controlled by the print module to print the image; and
- a display configured to be controlled by the display module to display the information.

3. The handheld IT device of claim 1, wherein the display module is configured to display a print progress image.

4. The handheld IT device of claim 3, wherein an area of the print progress image has a displayed intensity inversely proportional to a printing progress of a corresponding area of the image.

5. The handheld IT device of claim 3, wherein the display module is further configured to zoom in on a selected portion of the print progress image.

6. The handheld IT device of claim 3, wherein the display module is further configured to display a marker representing the handheld IT device on the print progress image.

7. A method comprising:
- receiving image data from an image source;
- capturing a plurality of navigational measurements;
- printing an image with a handheld image translation (IT) device, based at least in part on the image data and the captured plurality of navigational measurements, on a medium; and
- displaying information about progress of the printing of the image,
- wherein displaying information comprises displaying location information about one or more areas of the image that are not fully printed.

8. The method of claim 7, wherein displaying information comprises displaying a print progress image.

9. The method of claim 8, wherein displaying the print progress image comprises displaying an area of the print progress image with an intensity inversely proportional to a printing progress of a corresponding area of the image.

10. A handheld image translation (IT) device comprising:
- a position module configured to capture a plurality of navigational measurements;
- an image capture module configured to scan a target image on a surface of a medium adjacent to the handheld IT device as the handheld IT device is moved over the surface; and
- a display module configured to display information about progress of the scanning of the target image throughout the scanning of the target image,
- wherein the information includes location information about one or more areas of the target image that are not fully scanned, and
- wherein the location information includes one or more directional indicators providing directions, relative to the handheld IT device, of the one or more areas.

11. The handheld IT device of claim 10, further comprising:
- one or more navigation sensors configured to be controlled by the position module to capture the plurality of navigational measurements;
- one or more optical imaging sensors configured to be controlled by the image capture module to scan the target image; and
- a display configured to be controlled by the display module to display the information.

12. The handheld IT device of claim 10, wherein the display module is configured to display a scan progress image.

13. The handheld IT device of claim 12, wherein the display module is further configured to display a marker representing the handheld IT device on the scan progress image.

14. The handheld IT device of claim 12, wherein the image capture module is configured to capture a plurality of component surface images, the handheld IT device further comprising:

an image processing module configured to generate the scan progress image based at least in part on the plurality of navigational measurements and the plurality of component surface images.

15. A method comprising:

capturing a plurality of navigational measurements;

scanning a target image on a surface; and displaying information about progress of the scanning of the target image throughout the scanning of the target image, wherein the displaying information comprises displaying location information about one or more areas of the target image that are not fully scanned.

16. The method of claim 15, wherein the displaying information comprises displaying a scan progress image.

* * * * *